US012789794B2

(12) United States Patent
Unigame et al.

(10) Patent No.: US 12,789,794 B2
(45) Date of Patent: Nov. 10, 2026

(54) VEHICLE DRIVING SUPPORT APPARATUS, VEHICLE DRIVING SUPPORT METHOD, AND NON-TRANSITORY STORAGE MEDIUM STORING A PROGRAM

(71) Applicant: TOYOTA JIDOSHA KABUSHIKI KAISHA, Toyota (JP)

(72) Inventors: Takashi Unigame, Nagoya (JP); Yosuke Miyamoto, Tokyo (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 37 days.

(21) Appl. No.: 18/948,236

(22) Filed: Nov. 14, 2024

(65) Prior Publication Data

US 2025/0178601 A1 Jun. 5, 2025

(30) Foreign Application Priority Data

Dec. 4, 2023 (JP) ................................ 2023-204792

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 30/0956* (2013.01); *B60W 50/14* (2013.01); *B60W 2050/143* (2013.01); *B60W 2050/146* (2013.01); *B60W 2420/403* (2013.01); *B60W 2420/54* (2013.01); *B60W 2554/4041* (2020.02); *B60W 2554/80* (2020.02); *B60W 2556/10* (2020.02)

(58) Field of Classification Search
CPC .. B60W 30/09; B60W 10/18; B60W 30/0956; B60W 50/14; B60W 2554/4041; B60W 2556/10; B60W 2554/80; B60W 2050/143; B60W 2050/146; B60W 2420/403; B60W 2420/54
USPC ......................................................... 701/301
See application file for complete search history.

(56) References Cited

U.S. PATENT DOCUMENTS

| | | | |
|---|---|---|---|
| 9,969,261 | B2 | 5/2018 | Kodama |
| 10,045,173 | B1 | 8/2018 | Morimura et al. |

(Continued)

FOREIGN PATENT DOCUMENTS

| | | | |
|---|---|---|---|
| JP | 2021135191 | A | 9/2021 |
| JP | 6975856 | B2 | 12/2021 |
| JP | 2023035255 | A | 3/2023 |

*Primary Examiner* — Kenneth M Dunne
*Assistant Examiner* — Brian K Palmarchuk
(74) *Attorney, Agent, or Firm* — Hunton Andrews Kurth LLP

(57) ABSTRACT

A vehicle driving support apparatus comprises: an object detection section that repeatedly obtains a detection point of an object; an object recognition section that repeatedly updates object position recognition point that finally specifies the position of the object, based on the detection point obtained at a past time point and at a present time point; and a vehicle control section that performs an automatic braking, when determining that an automatic brake condition becomes satisfied. The vehicle control section is configured not to perform the automatic braking when the object detection section does not obtain the detection point at the present time point.

5 Claims, 6 Drawing Sheets

(51) Int. Cl.

| | |
|---|---|
| ***B60W 30/095*** | (2012.01) |
| ***B60W 50/14*** | (2020.01) |

(56) References Cited

U.S. PATENT DOCUMENTS

| | | | | |
|---|---|---|---|---|
| 10,106,157 | B2 | 10/2018 | Sawada et al. | |
| 10,150,407 | B2 | 12/2018 | Takahashi et al. | |
| 10,696,297 | B2 | 6/2020 | Nguyen Van et al. | |
| 11,001,255 | B2 | 5/2021 | Fukuman et al. | |
| 11,110,937 | B2 | 9/2021 | Kinoshita et al. | |
| 2016/0016560 | A1* | 1/2016 | Parker | B60T 8/171 701/70 |
| 2019/0001968 | A1 | 1/2019 | Yorifuji et al. | |
| 2019/0344828 | A1 | 11/2019 | Omori et al. | |
| 2019/0389488 | A1 | 12/2019 | Yamada et al. | |
| 2023/0234571 | A1* | 7/2023 | Sato | B60W 30/09 701/26 |
| 2023/0288559 | A1* | 9/2023 | Okabe | G01S 15/878 |
| 2023/0334836 | A1* | 10/2023 | Matthaei | G06V 20/58 |
| 2024/0134039 | A1* | 4/2024 | Sekiguchi | G08G 1/167 |

* cited by examiner

VEHICLE DRIVING SUPPORT APPARATUS, VEHICLE DRIVING SUPPORT METHOD, AND NON-TRANSITORY STORAGE MEDIUM STORING A PROGRAM

CROSS-REFERENCE TO RELATED APPLICATIONS

This application claims priority to Japanese patent application No. JP 2023-204792 filed on Dec. 4, 2023, the content of which is hereby incorporated by reference in its entirety.

TECHNICAL FIELD

The present disclosure relates to a vehicle driving support apparatus, a vehicle driving support method, and a program thereof, for performing an automatic braking to avoid a collision between a host vehicle and an object.

BACKGROUND

A conventional apparatus comprises a determining section for obtaining a travel path based on a steering angle of a host vehicle, and determining whether or not the host vehicle will collide with an obstacle detected by an ambient sensor such as a camera and a sonar if the host vehicle travel along the travel path. The apparatus further comprises an alert section for alerting based on the result of the determination made by the determining section (refer to Japanese Patent No. 6975856).

Another conventional apparatus is configured to stop the host vehicle by executing an automatic braking when there is a probability that the host vehicle collides with the obstacle.

However, the conventional apparatuses have a problem described below. That is, for example, as shown in FIG. 6A, when an other vehicle is at a complete stop at a time point t0, the ambient sensor of the host vehicle detects the other vehicle as an obstacle at the time point t0. The white circles in FIGS. 6A and 6B indicate points representing the position/location of the obstacle detected by the ambient sensor at the present time point. When the host vehicle completely stops at a time point t1, the ambient sensor may sometimes not newly detect points representing the position of the obstacle. Therefore, the points representing the position of the obstacle are held. The black circles in FIGS. 6A and 6B indicate the held points representing the position of the obstacle. This causes the host vehicle to erroneously recognize that the obstacle is still present at the position represented by the held points representing the position of the obstacle at a time point t2, even if the other vehicle has moved by the time point t2. When a driver of the host vehicle tries to start moving the host vehicle at the time point t2, the automatic braking is executed in order to avoid a collision between the host vehicle and the erroneously recognized obstacle. This leads to a case where the host vehicle cannot be started despite that the obstacle (namely, the other vehicle) is actually not present.

In view of the above, as shown in FIG. 6B, the apparatus may be configured to recognize that the obstacle is present at the location indicated by the points (i.e., the white circles) detected by the ambient sensor at the present time point, not by the held points (i.e., the black circles). The thus configured apparatus may be able to avoid an occurrence of the case where the host vehicle cannot be started due to the automatic braking. However, when the other vehicle continues being at the complete stop, the thus configured apparatus may not be able to recognize a point P representing a part of the other vehicle at the present time point, depending on a positional relationship between a detection area Da of the ambient sensor and the other vehicle. This may cause the host vehicle to contact the other vehicle at the point P, if the automatic braking is not actuated.

SUMMARY

The present disclosure is made to cope with the above-described problem. Namely, one of objects of the present disclosure is to provide a vehicle driving support apparatus, a vehicle driving support method, and a program thereof, that can reduce a possibility of executing an unnecessary automatic braking.

One of embodiments of the vehicle driving support apparatus according to present disclosure comprises:

- an object detection section (10*a*, 11-14, 20*a*, 21F-26F, 21R-26R) that repeatedly obtains a detection point representing a position of an object around a host vehicle;
- an object recognition section (20*b*) that repeatedly updates surrounding object information including object position recognition point that finally specifies the position of the object, based on the detection point obtained by the object detection section at a past time point and the detection point obtained by the object detection section at a present time point; and
- a vehicle control section (20*c*) that performs an automatic braking to avoid a collision between the host vehicle and the object, when determining, based on the surrounding object information, that a predetermined automatic brake condition that becomes satisfied when there is a high probability that the host vehicle collides with the object becomes satisfied.

Furthermore, the vehicle control section is configured not to perform the automatic braking when the object detection section does not obtain the detection point representing a position of the object that causes the automatic braking condition to become satisfied at a present time point (Step 415 in FIG. 4: No, Step 420, and Step 445: No)

According to the above embodiment, based on the detection point obtained by the object detection section at a past time point and the detection point obtained by the object detection section at a present time point, the object position recognition point that finally specifies the position of the object is updated. Then, the automatic braking is performed when it is determined, based on the surrounding object information including the object position recognition point, the predetermined automatic brake condition that becomes satisfied when there is a high probability that the host vehicle collides with the object becomes satisfied. However, when the object detection section does not obtain the detection point representing a position of the object that causes the automatic braking condition to become satisfied (i.e., the object determined to be likely to collide with the host vehicle) at the present time point, that object is likely to have already moved. In view of the above, even when the automatic braking condition becomes satisfied, the above embodiment does not perform the automatic braking (i.e., prohibit performing the automatic braking) when the object detection section does not obtain the detection point representing a position of the object that causes the automatic braking condition to become satisfied at the present time point. In other words, when the object detection section obtains the detection point representing a position of the object that causes the automatic braking condition to become satisfied at the present time point, the object is still present at the position specified by the object position recognition point. Therefore, in this case, the automatic braking is performed when the automatic braking condition becomes satisfied. Consequently, a frequency that an unnecessary automatic braking is performed is reduced, and the automatic braking can be performed when it is necessary.

Notably, in the above description, in order to facilitate understanding of the present disclosure, the constituent elements corresponding to those of an embodiment which will be described later are accompanied by parenthesized symbols and/or names which are used in the embodiment; however, the constituent elements of the disclosure are not limited to those in the embodiment defined by the symbols and/or names. The present disclosure covers a vehicle driving support method, and a program thereof.

DETAILED DESCRIPTION

Figure 1:
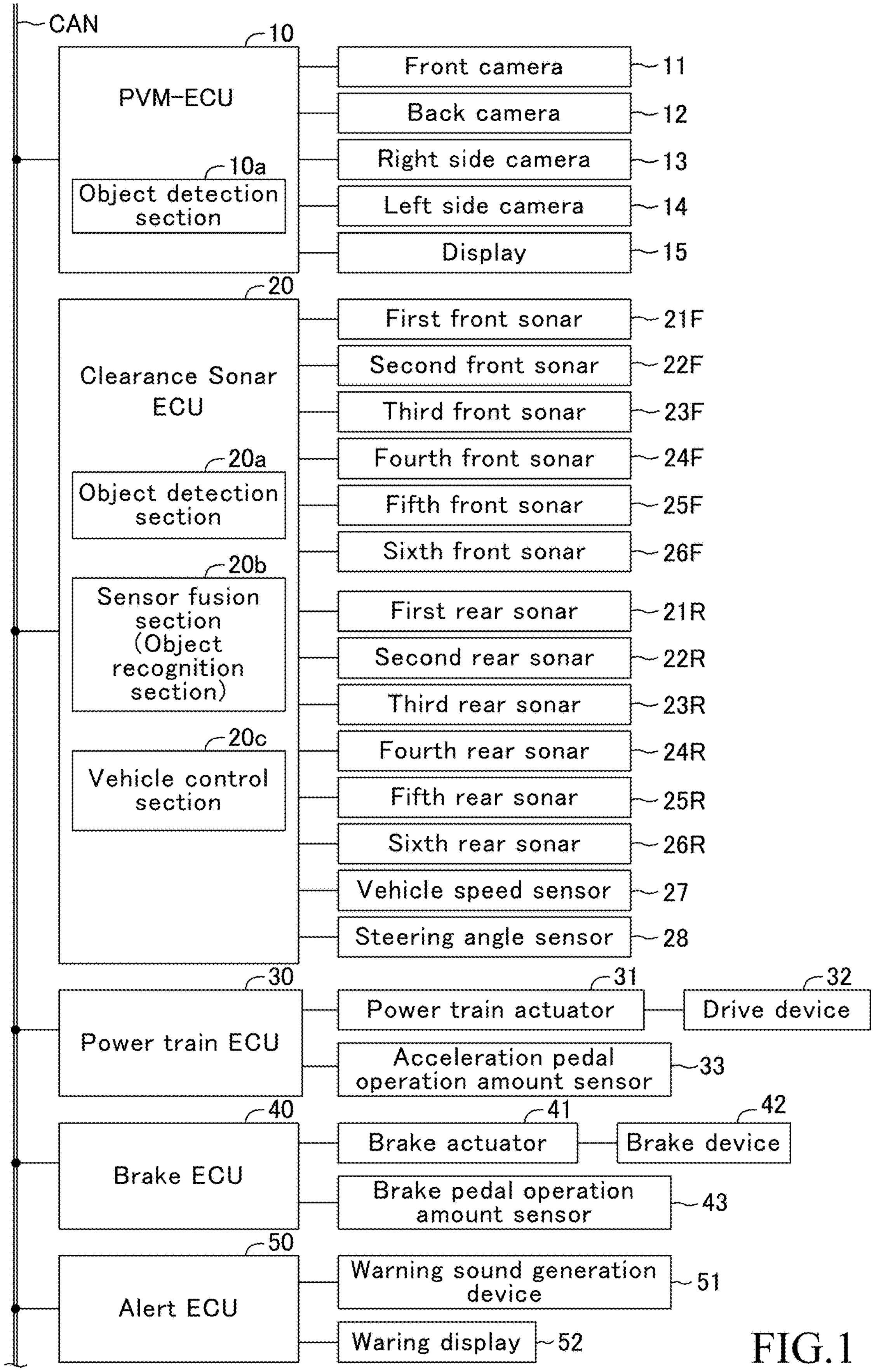
FIG. 1 is a schematic diagram of a vehicle driving support apparatus according to an embodiment of the present disclosure.

A vehicle driving support apparatus DS (hereinafter, referred to as an "apparatus DS") according to an embodiment of the present disclosure comprises components/elements illustrated in FIG. 1. The apparatus DS is applied to and/or is mounted on a host vehicle. The host vehicle may be referred to as an own car, and may be one of a vehicle having an internal combustion engine as a drive source, a vehicle having an electric motor as a drive source (namely, an electric vehicle), and a hybrid vehicle. A vehicle other than the host vehicle may be referred to as an other vehicle.

In the present specification, an "ECU" means an electronic control device/unit (i.e., a control unit), that includes a microcomputer. The microcomputer includes a CPU (processor), a ROM, a RAM, a data writable involatile memory, and an interface. The ECU may sometimes be referred to as a "controller" or a "computer". A plurality of ECUs shown in FIG. 1 are connected to each other through Controller Area Network (CAN) in such a manner that they can exchange information with each other. Some or all of these ECUs may be integrated into a single ECU.

Figure 2:
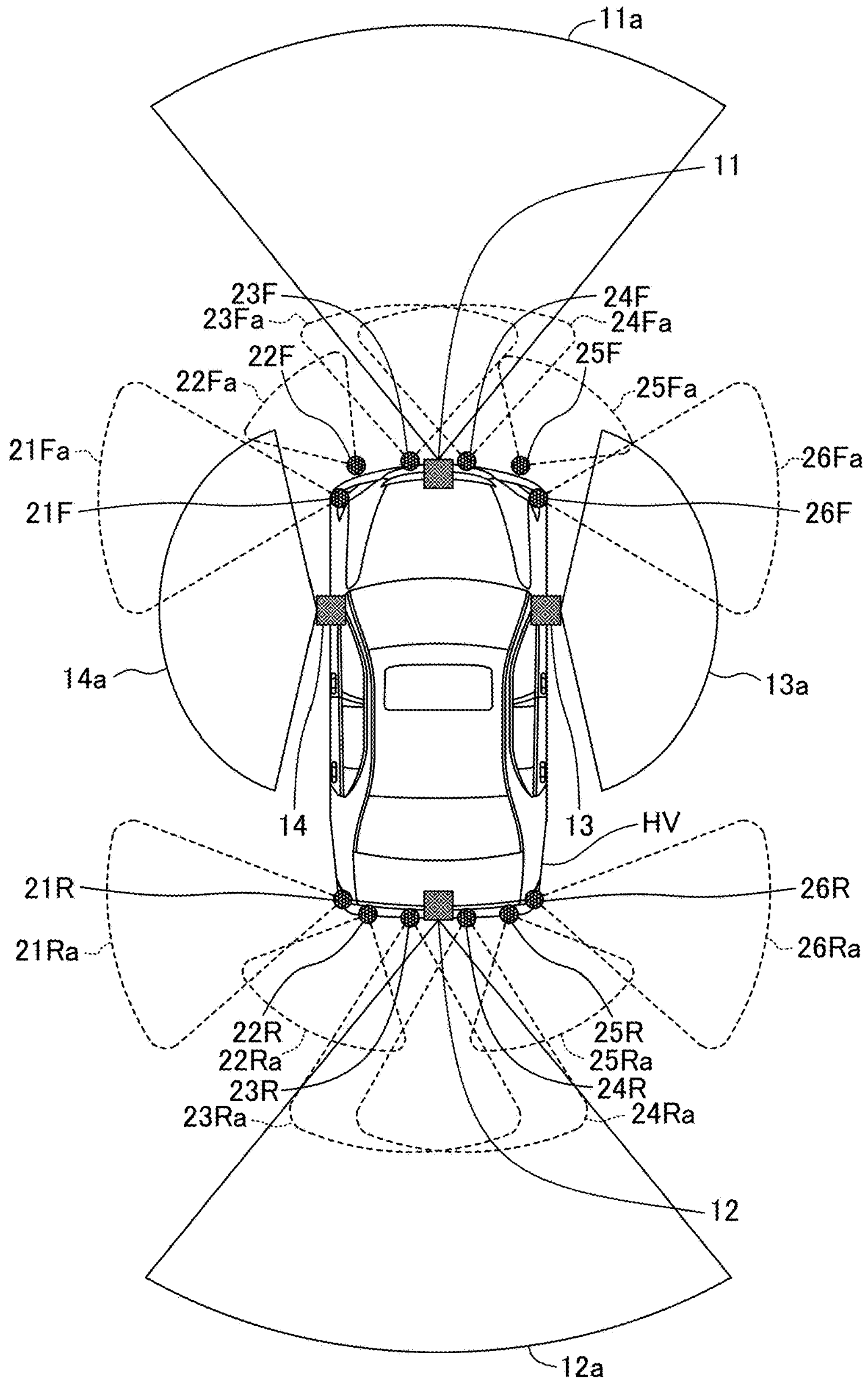
FIG. 2 shows a plan view of a host vehicle showing disposed positions of cameras and sonars, and object detection areas thereof.

A PVM (panoramic view monitor)-ECU 10 obtains image data every time a predetermined time elapses from cameras, each of which has a wide angle lens. The cameras include a front camera 11 to take a picture of a vehicle frontward scene, a back camera 12 to take a picture of a vehicle backward scene, a right side camera 13 to take a picture of a vehicle rightward scene, and a left side camera 14 to take a picture of a vehicle leftward scene. These cameras are arranged at respective positions of the host vehicle HV as shown in FIG. 2. In FIG. 2, the shooting areas of the cameras are denoted by 11*a*, 12*a*, 13*a*, and 14*a*. For example, the area denoted by the reference number 11*a* is the shooting area of the front camera 11. Based on the image data from these cameras, the PMV-ECU 10 generates an overhead image of the host vehicle and a vehicle's travel direction image of the host vehicle. The PMV-ECU 10 causes the display 15 to display the overhead image and the vehicle's travel direction image.

The PMV-ECU 10 comprises an object detection section 10*a* as a function. Based on the camera information which includes the image data from the cameras 11-14, the object detection section 10*a* obtains a point (coordinate point) that is highly likely to represent a position/location of an object according to a known method (refer to Japanese Patent Application Laid-Open No. 2021-135191, and Japanese Patent Application Laid-Open No. 2023-35255). The point representing the position of the object, obtained by the object detection section 10*a*, may be referred to as a "camera detection point".

A clearance sonar ECU 20 obtains signals from a first to sixth front sonar 21F-26F, a first to first to sixth rear sonar 21R-26R, a vehicle speed sensor 27, a steering angle sensor 28, or the like, every time a predetermined time elapses. These sonars are arranged at respective positions as shown in FIG. 2. In FIG. 2, the object detection areas (i.e., ultra-sonic radiation area) of the sonars are denoted by 21Fa-26Fa, and 21Ra-26Ra. For example, the area denoted by the reference number 21Fa is the object detection area of the first front sonar 21F.

Each sonar transmits an ultra-sonic wave to the respective object detection area, and receives a reflection wave. The reflection wave is generated by the object that reflects the transmitted ultra-sonic wave. Furthermore, each of the sonars sends clearance sonar information to the clearance sonar ECU 20. The clearance sonar information includes time length between a time point at which the sonar transmits the ultra-sonic wave and a time point at which the sonar receives the reflection wave, and "frequency and intensity (reflection intensity)" of the received reflection wave.

The clearance sonar ECU 20 comprises an object detection section 20*a*, a sensor fusion section 20*b*, and a vehicle control section 20*c*, as functions.

The object detection section 20*a* measures a distance between each of sonars and an object, based on the sonar information. The object detection section 20*a* obtains point (coordinate point) representing a position of the object relative to the host vehicle HV, based on triangulation, from "the distance from the object to a third front sonar 23F and the distance from the object to a fourth front sonar 24F" and "a distance between the two sonars 23F and 24F". The two sonars 23F and 24F are adjacent to each other. Similarly, the object detection section 20*a* obtains point (coordinate point) representing a position of the object relative to the host vehicle HV, based on triangulation, from "the distance from the object to a third rear sonar 23R and the distance from the object to a fourth rear sonar 24R" and "a distance between the two sonars 23R and 24R". The two sonars 23R and 24R are adjacent to each other.

Each of a first front sonar 21F, a second front sonar 22F, a fifth front sonar 25F, a sixth front sonar 26F, a first rear sonar 21R, a second rear sonar 22R, a fifth rear sonar 25R, and a sixth rear sonar 26R is referred to as a "independent sonar". When the host vehicle HV is traveling, the object detection section 20*a* obtains point (coordinate point) representing a position of the object relative to the host vehicle HV, based on triangulation, from "the distance from the object to the independent sonar a predetermined time length before a present time point", "the distance from the object to the independent sonar at the present time point", a moving direction of the host vehicle for a period having the predetermined time length, and a moving distance of the host vehicle for the period having the predetermined time length. In other words, when the host vehicle is at the complete stop, the object detection section 20*a* cannot obtain the point representing the position of the object based on the signals of the independent sonars. It should be noted that the point (coordinate point) representing the position of the object, obtained by the object detection section 20*a*, may be referred to as a "sonar detection point".

The sensor fusion section 20*b* integrates the points (i.e., the camera detection points) representing the position of the object obtained by the object detection section 10*a* of the PVM-ECU 10 and the points (i.e., the sonar detection points) representing the position of the object obtained by the object detection section 20*a* of the clearance sonar ECU 20 into "fusion detection points (coordinate points)" (refer to Japanese Patent Application Laid-Open No. 2021-135191). It should be noted that the fusion detection point may be produced based on solely one of the camera detection point and a sonar detection point. The sensor fusion section 20*b* may be referred to as an "object recognition section". Furthermore, as described later, the sensor fusion section 20*b* generates/produces object position recognition points that finally specify position of the object based on the fusion detection points obtained at the past time point and the fusion detection points obtained at the present time point. In addition, the sensor fusion section 20*b* obtains through calculation a relative speed of each of the object position recognition points to the host vehicle HV. Therefore, it can be said that the sensor fusion section 20*b* repeatedly obtains/updates surrounding object information including the object position recognition points.

The vehicle control section 20*c* performs/executes a driving support control (i.e., a collision avoidance support control) to avoid a collision (contact) between the host vehicle and an object. Namely, when the vehicle control section 20*c* determines that there is a probability that the host vehicle collides with an obstacle, based on the object position recognition points, the vehicle speed Vh obtained from the vehicle speed sensor 27, the steering angle Sa obtained from the steering angle sensor 28, and the like, the vehicle control section 20*c* executes an alert (e.g., a generation of warning sound and a display of warning sign) by transmitting an instruction to an alert ECU 50 described later, and/or applies the automatic braking to the host vehicle by transmitting an instruction to a brake ECU 40.

A power train ECU 30 drives a power train actuator 31 to control a drive device 32 including the drive source of the host vehicle, so as to generate a drive force of the host vehicle. The power train ECU 30 obtains an acceleration pedal operation amount AP from an acceleration pedal operation amount sensor 33. The power train ECU 30 can actuate the power train actuator 31 to adjust/vary the drive force of the host vehicle in accordance with an instruction from the vehicle control section 20*c* of the clearance sonar ECU 20 or the acceleration pedal operation amount AP.

A brake ECU 40 drives a brake actuator 41 to control a brake device 42 of the host vehicle, to thereby apply a brake force to the host vehicle. The brake ECU 40 obtains a brake pedal operation amount BP from a brake pedal operation amount sensor 43. The brake ECU 40 can actuate the brake actuator 41 to apply the brake force to the host vehicle in accordance with an instruction from the vehicle control section 20*c* of the clearance sonar ECU 20 or the brake pedal operation amount BP. Therefore, the brake ECU 40 can execute/perform the automatic braking to decelerate and stop the host vehicle based on an instruction from the vehicle control section 20*c*.

An alert ECU 50 can control a warning sound generation device 51 that generates the warning sound and a waring display 52 that displays the warning sign. The warning display 52 is disposed at a position in such a manner that the driver can visually recognize it.

It should be noted that the above-described ECUs (10-50) are connected with unillustrated sensors that detect states of the host vehicle HV.

Outline of Operation

Figure 3A:
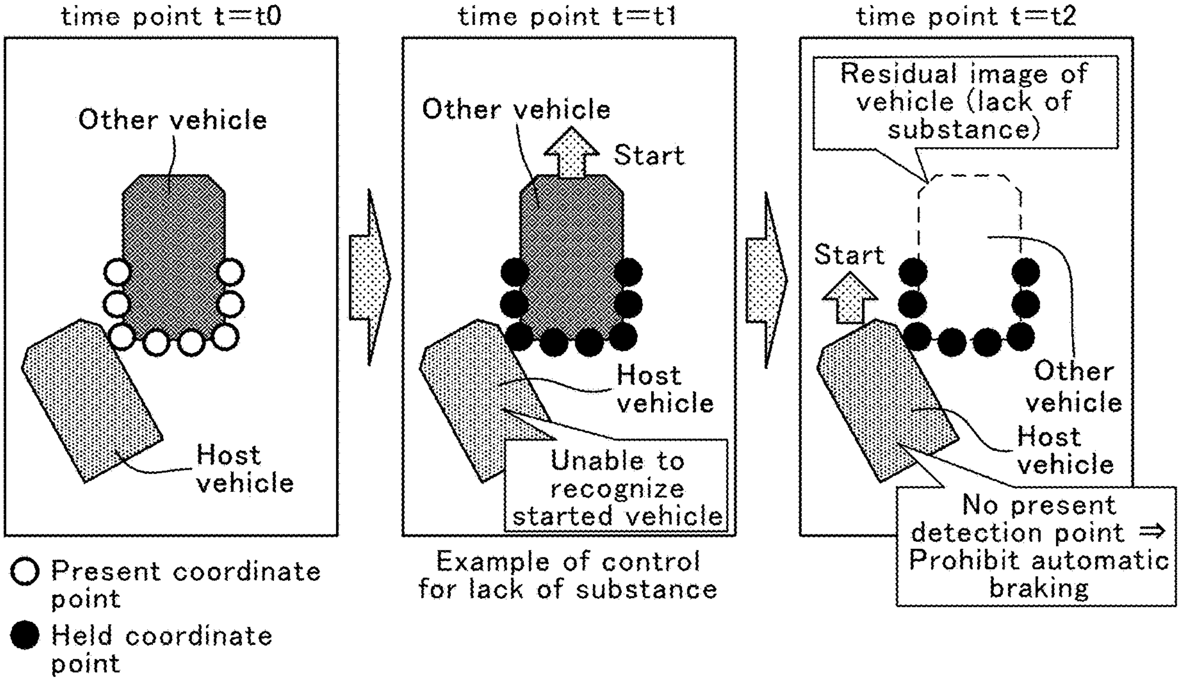
FIG. 3A is a drawing for describing operations of the vehicle driving support apparatus shown in FIG. 1.

For example, as shown in FIG. 3A, when the other vehicle is at complete stop in the vicinity of the host vehicle at a time point to, the apparatus DS (i.e., the vehicle control section 20*c*) determines that an obstacle is present at a position represented by the present/current fusion detection points (coordinate points) that are the object position recognition points shown by the white circles. Thereafter, when the host vehicle fully stops at a time point t1, the apparatus DS determines that the obstacle is present at a position represented by the held fusion detection points (coordinate points) that are the object position recognition points shown by the black circles. Thereafter, when the host vehicle tries to start moving forward at a time point t2 after the other vehicle has already moved, the apparatus DS prohibits the automatic braking, since the object position recognition points do not include the present/current fusion detection points (coordinate points).

Figure 3B:
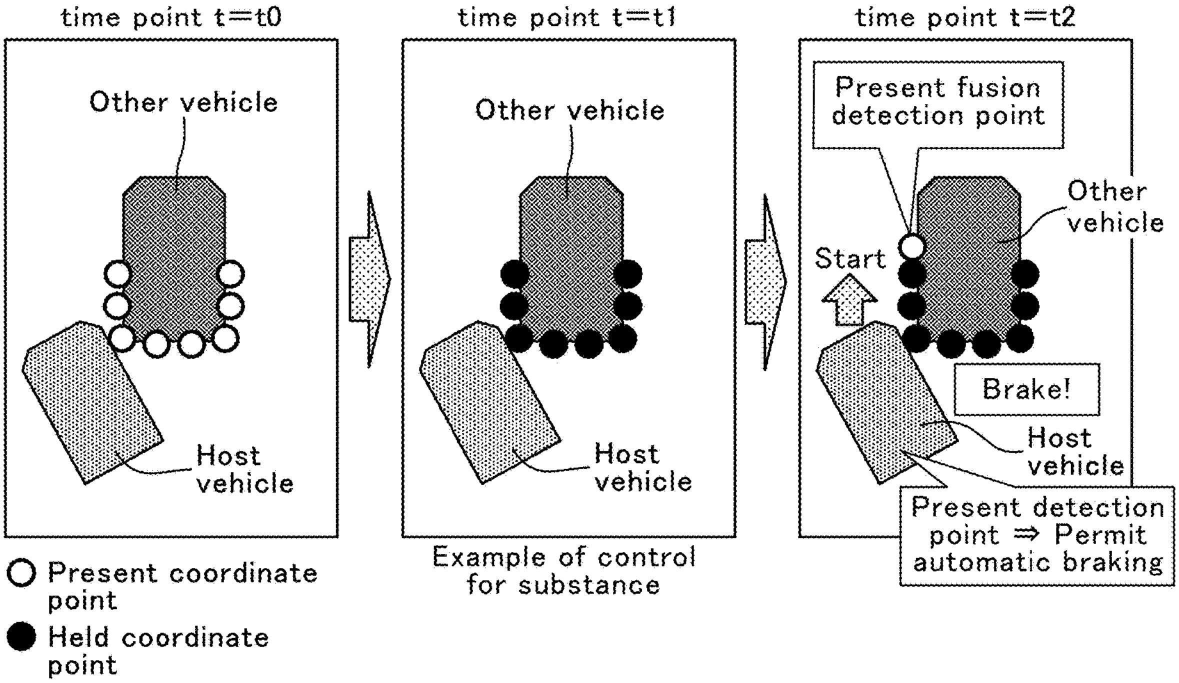
FIG. 3B is a drawing for describing operations of the vehicle driving support apparatus shown in FIG. 1.

In contrast, as shown in FIG. 3B, when the other vehicle is at complete stop in the vicinity of the host vehicle at a time point to, the apparatus DS (i.e., the vehicle control section 20*c*) determines that an obstacle is present at a position represented by the present/current fusion detection points (coordinate points) that are the object position recognition points shown by the white circles. Thereafter, when the host vehicle fully stops at a time point t1, the apparatus DS determines that the obstacle is present at a position represented by the held fusion detection points (coordinate points) that are the object position recognition points shown by the black circles. Thereafter, when the host vehicle starts moving forward at a time point t2 while the other vehicle continues being at complete stop, the apparatus DS permits the automatic braking, since the object position recognition points include the present/current fusion detection points (coordinate points) shown by the white circle.

In this manner, in a situation where the automatic braking is required, when the object position recognition points of the object that causes an automatic brake condition to be satisfied does not include the present fusion detection point (i.e., at least one of the camera detection point that is presently obtained and the sonar detection point that is presently obtained), the apparatus DS determines that the object is not present to thereby prohibit the automatic braking. Whereas, when the object position recognition points of the object that causes the automatic brake condition to be satisfied does include the present fusion detection point, the apparatus DS determines that the object is still present to thereby permit the automatic braking.

Specific Operation

Figure 4:
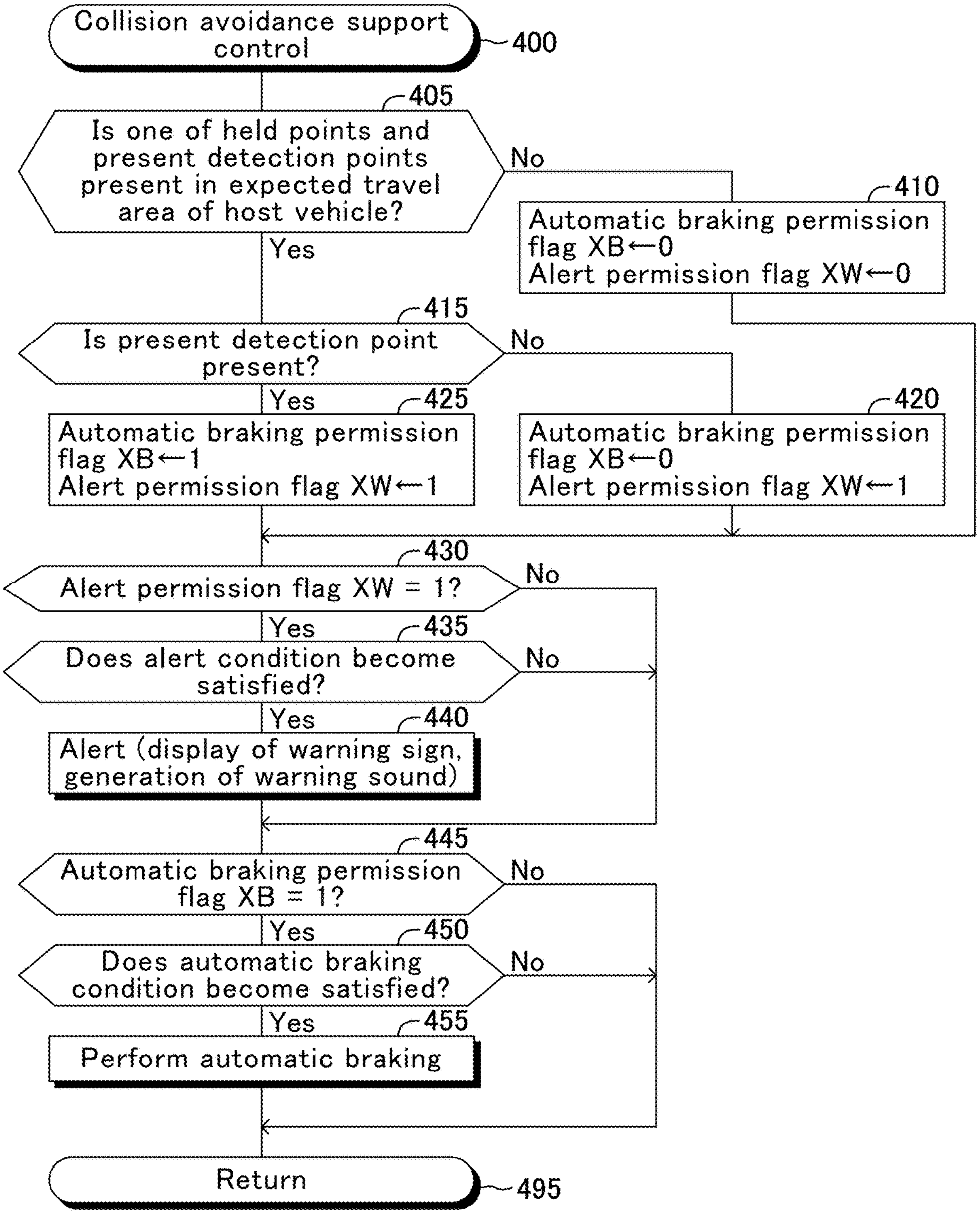
FIG. 4 shows a routine executed by a CPU of a clearance sonar ECU shown in FIG. 1.
Figure 5:
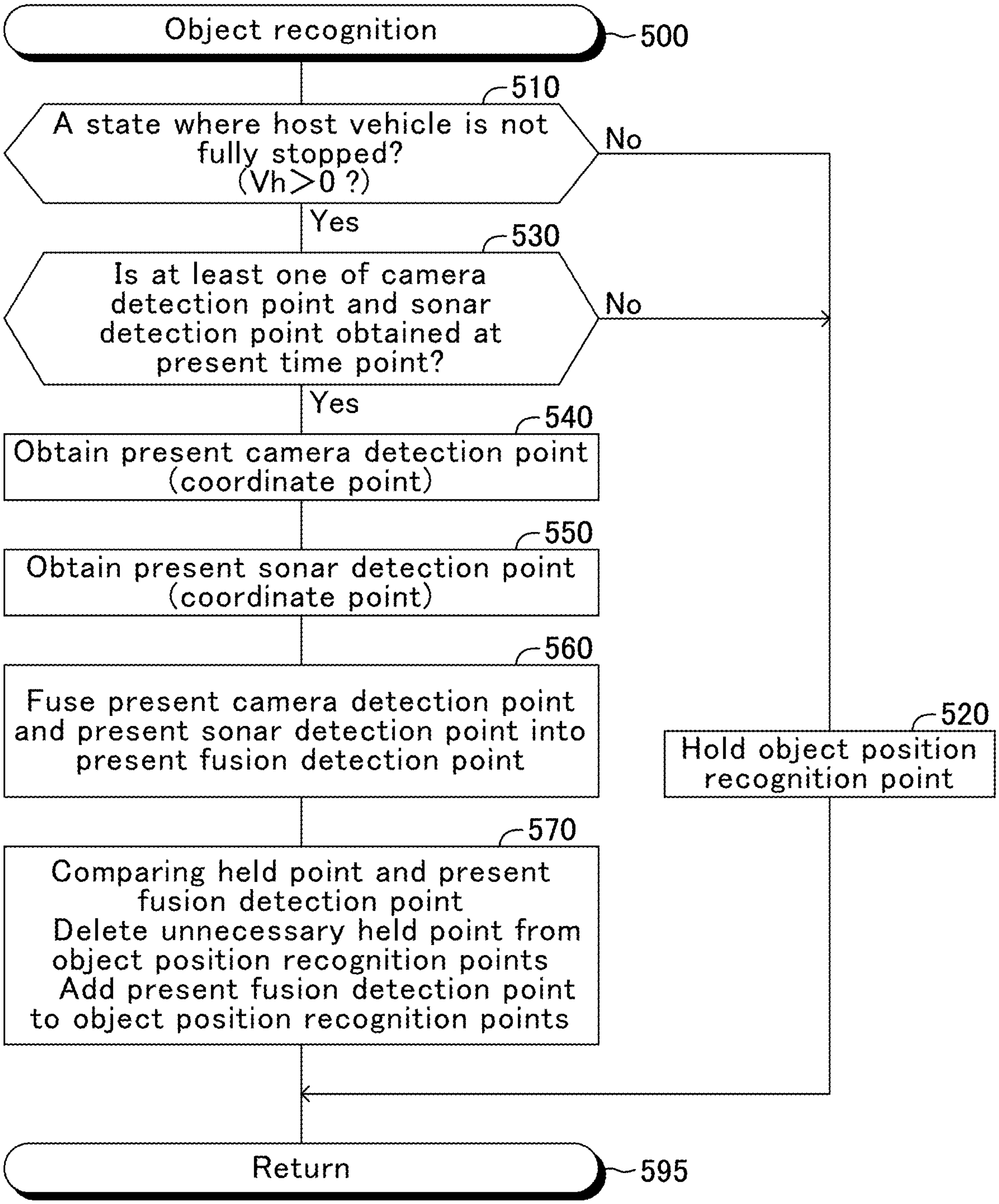
FIG. 5 shows a routine executed by the CPU of the clearance sonar ECU shown in FIG. 1.
Figure 6A:
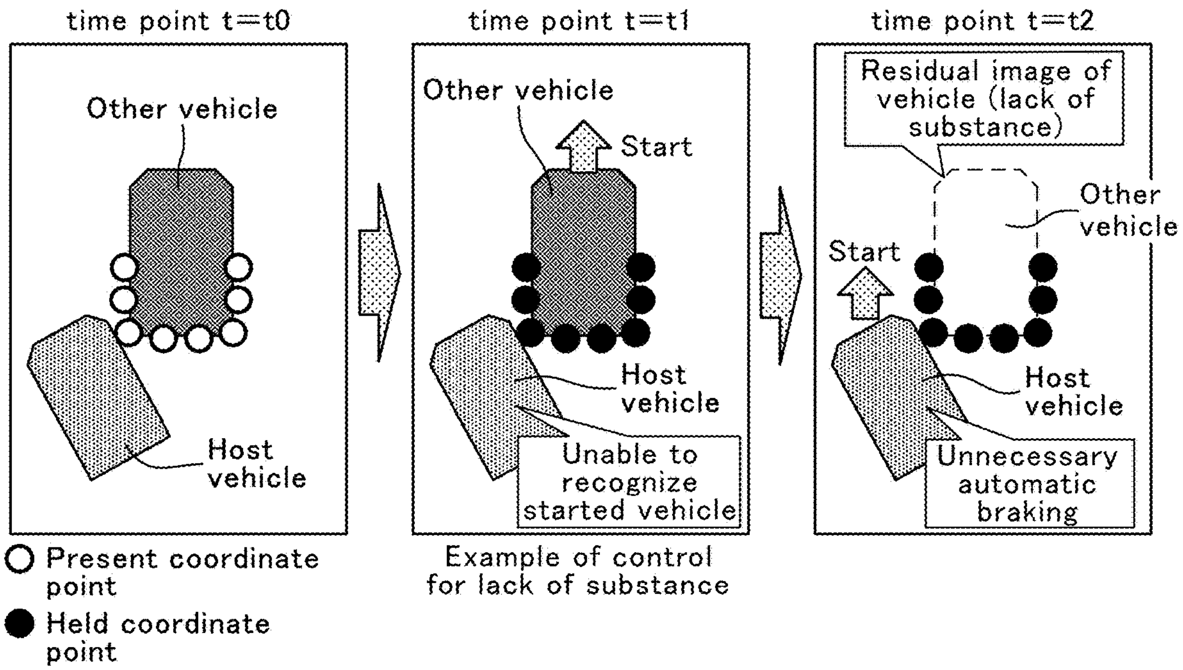
FIG. 6A is a drawing for describing operations of a conventional apparatus.
Figure 6B:
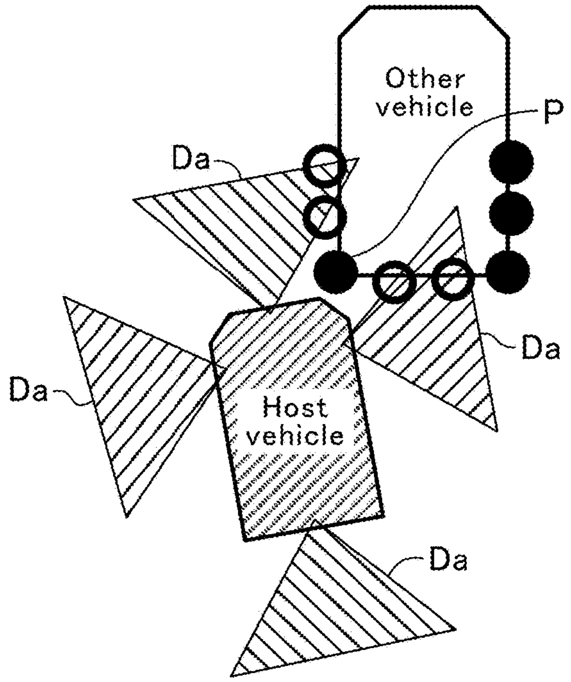
FIG. 6B is a drawing for describing operations of the conventional apparatus.

The CPU of the clearance sonar ECU 20 (hereinafter, simply referred to as a "CPU") executes routines shown by flowcharts in FIGS. 4 and 5, every time a predetermined time (calculation cycle) dt elapses. It should be noted that, hereinafter, "step" is expressed as "S". FIG. 4 is a flowchart for realizing the function of the vehicle control section 20*c*, and FIG. 5 is a flowchart for realizing the function of the sensor fusion section 20*b*.

<Collision Avoidance Support Control>

When an appropriate time point comes, the CPU starts processing from S400 in FIG. 4, and proceeds to S405. At S405, the CPU predicts an expected travel area of the host vehicle within a certain time period, based on the steering angle Sa and the vehicle speed Vh. The expected travel area is an area which the host vehicle is expected to pass through. Furthermore, the CPU determines whether or not at least one of held points and present detection points is present in the expected travel area of the host vehicle. The held point is the fusion detection point (coordinate point) that was obtained in the past and is held. The present detection point is the fusion detection point (coordinate point) that is obtained at the present time point (i.e., at the last obtaining/sampling timing).

When the none of the held points and the present detection points is present in the expected travel area, the CPU proceeds to S410 from S405, the CPU sets a value of an automatic braking permission flag XB to "0", and sets a value of an alert permission flag XW to "0". As described later, when the value of the automatic braking permission flag XB is "1", the automatic braking is permitted. When the value of the automatic braking permission flag XB is "0", the automatic braking is prohibited. Similarly, when the value of the alert permission flag XW is "1", the "alert/warning to notify the driver of presence of an obstacle (i.e., the generation of warning sound and/or the display of warning sign)" is permitted. When the value of the alert permission flag XW is "0", the "alert/warning" is prohibited. Thereafter, the CPU proceeds to S430.

Whereas, when at least one of the held points and the present detection points is present in the expected travel area, the CPU proceeds to S415 from S405. At S415, the CPU determines whether or not there is at least one present detection point that is determined to represent the position of an object which is the same as the object that is specified by the held points and are determined to be present in the expected travel area at S405. For example, when a distance between the present detection point and the held point that is closest to this present detection point is equal to or shorter than a same object determination threshold, the CPU determines that this present detection point represents the position of the object that is specified by the held points. In other words, the CPU determines whether or not a "fusion detection point of the object that is deemed to be present in the expected travel area" has been obtained at the present time point (i.e., at the last obtaining/sampling timing). It should be noted that this present detection point does not have to be present in the expected travel area. It should also be noted that, when it is determined that the present detection point is present in the expected travel area at S405, the CPU makes a "Yes" determination at S415 without fail.

When there is no present detection point, the CPU proceeds to S420 from S415. At S420, the CPU sets the value of the automatic braking permission flag XB to "0", and sets the value of the alert permission flag XW to "1". Thereafter, the CPU proceeds to S430. This permits the alert, but prohibit the automatic braking, as described later.

Whereas, when there is the present detection point, the CPU proceeds to S425 from S415. At S425, the CPU sets the value of the automatic braking permission flag XB to "1", and sets the value of the alert permission flag XW to "1". Thereafter, the CPU proceeds to S430. This permits both of the alert and the automatic braking, as described later.

At S430, the CPU determines whether or not the value of the alert permission flag XW is "1".

When the value of the alert permission flag XW is "1", the CPU proceeds to S435 from S430, and determines whether or not an alert condition becomes satisfied. Specifically, the CPU calculates a collision required time TTC of each of "the held points and the present detection points" present in the expected travel area. Hereinafter, each of "the held points and the present detection points" present in the expected travel area is referred to as an "obstacle point". The collision required time TTC is calculated by dividing a length of a path along which a body of the host vehicle approaches the obstacle point by a speed of the obstacle point relative to the host vehicle (i.e., a relative speed of the obstacle point). Then, the CPU selects the shortest collision required time TTCm from those collision required times TTCs, and determines whether or not the shortest collision required time TTCm is equal to or smaller than an alert threshold TWth. When the shortest collision required time TTCm is equal to or smaller than the alert threshold TWth, the alert condition is satisfied.

When the alert condition is satisfied, the CPU proceeds to S440 from S435, and transmits the instruction to the alert ECU 50 to thereby cause the warning sound generation device 51 to generate the warning sound and cause the warning display 52 to display the warning sign. Thereafter, the CPU proceeds to S445.

Whereas, when the alert condition is not satisfied, the CPU directly proceeds to S445 from S435. In this case, neither the generation of the warning sound nor display of the warning sign is performed.

When the CPU proceeds to S430, the CPU directly proceeds to S445 from S430, if the value of the alert permission flag XW is not "1". Accordingly, the alert is prohibited. Namely, in this case as well, neither the generation of the warning sound nor display of the warning sign is performed.

At S445, the CPU determines whether or not the value of the automatic braking permission flag XB is "1".

When the value of the automatic braking permission flag XB is "1", the CPU proceeds to S450 from S445, and determines whether or not an automatic braking condition becomes satisfied. Specifically, the CPU obtains the above-described shortest collision required time TTCm, and determines whether or not the shortest collision required time TTCm is equal to or smaller than an automatic braking threshold TBth. The automatic braking threshold TBth has been set to a value smaller than the alert threshold TWth. The automatic braking condition is satisfied when the shortest collision required time TTCm is equal to or smaller than the automatic braking threshold TBth.

When the automatic braking condition is satisfied, the CPU proceeds to S455 from S450, and transmits the instruction to the brake ECU 40 to thereby actuate the brake device 42 by driving the brake actuator 41 in order to apply the brake force to the host vehicle so that the host vehicle is fully stopped. Namely, the CPU executes the automatic braking. It should be noted that the CPU also transmits the instruction to the power train ECU 30 to control the drive device 32 by driving the power train actuator 31, in order to make the driving force of the host vehicle become zero. Thereafter, the CPU proceeds to S495 to terminate the present routine tentatively.

Whereas, when the automatic braking condition is not satisfied, the CPU directly proceeds to S495 from S450. Accordingly, in this case, the automatic braking is not executed.

In addition, when the CPU proceeds to S445, the CPU directly proceeds to S495 from S445, if the automatic braking permission flag XB is not "1". Namely, the automatic braking is prohibited. In this case as well, the automatic braking is not executed.

It should be noted that the condition to be determined at S405 is a prerequisite condition for the automatic braking condition. Thus, when the automatic braking condition becomes satisfied, it can be said that the CPU determines whether or not the detection point representing the position of the object that has caused the automatic braking condition to become satisfied has been obtained at the present time point, at S415. In other words, when the automatic braking condition becomes satisfied, it can be said that the CPU determines whether or not at least one of "the present camera detection points" and "the present sonar detection points" of an object that is the same as the object that has caused the automatic braking condition to become satisfied has been obtained, at S415.

<Object Recognition>

When an appropriate time point comes, the CPU starts processing from S500 in FIG. 5, and proceeds to S510. At S510, the CPU determines whether or not the host vehicle is not fully stopped (namely, the host vehicle speed Vh is greater than "0").

When the host vehicle is at a fully stopped state, the CPU proceeds to S520 from S510. At S520, the CPU holds, as the held point, the fusion detection point(s) (coordinate point(s)) of when the present routine was executed the predetermined time dt before the present time point. Namely, the object position recognition point the predetermined time before is held as the held point. Thereafter, the CPU proceeds to S595 to terminate the present routine tentatively.

Whereas, when the host vehicle is not at the fully stopped state, the CPU proceeds to S530 from S510. At S530, the CPU determines whether or not at least one of the camera detection point and the sonar detection point has been obtained at the present time point (i.e., at the last obtaining/sampling timing). Namely, the CPU determines whether or not at least one of the present camera detection point and the present sonar detection point has been obtained. When neither the present camera detection point nor the present sonar detection point has been obtained (namely, when neither the object detection section 10*a* nor the object detection section 20*a* has obtained points (coordinate point) representing a position of an object at the present time point), the CPU proceeds to S520 from S530. At step 520, the CPU holds, as the held point, the object position recognition point(s) of when the present routine was executed the predetermined time dt before the present time point. Thereafter, the CPU proceeds to S595 to terminate the present routine tentatively. It should be noted that the CPU can omit the process of S510. In this case, the CPU directly proceeds to S530 from S500.

Whereas, when at least one of the camera detection point and the sonar detection point has been obtained at the present time point (i.e., at the last obtaining/sampling timing), the CPU proceeds to S540 from S530, and obtains the camera detection point at the present time point (i.e., the present camera detection point). Note that, if the present camera detection point is not present, the CPU does not execute the process of S540. Thereafter, the CPU proceeds to S550 to obtain the sonar detection point at the present time point (i.e., the present sonar detection point). Note that, if the present sonar detection point is not present, the CPU does not execute the process of S550.

Subsequently, at S560, the CPU fuses the present camera detection point and the present sonar detection point so as to generate the fusion detection point at the present time point (i.e., the present fusion detection point).

Thereafter, the CPU proceeds to S570 to execute processes described below by comparing the held point(s) at that time point and the present fusion detection point(s), and proceeds to S595.

(First process) The CPU deletes the held point, that has not been detected as the present fusion detection point for a predetermined constant time, among the held points, as unnecessary held point, from the object position recognition points. In other words, among the held points, the CPU eliminates a specific held point from the object position recognition points, wherein "the number of consecutive times of a case where an object is not present at the specific held point is confirmed based on the camera detection point and/or the sonar detection point" is equal to or greater than the predetermined number of times.

(Second process) The CPU let the present fusion detection point included in the object position recognition point.

As has been described above, when "the object position recognition point(s) representing an object whose possibility of colliding with the host vehicle is equal to or greater than a threshold (i.e., the object that causes the automatic braking condition to be satisfied)" does not include "the present fusion detection point (i.e., at least one of the present camera detection point and the present sonar detection point), the apparatus DS determines that the object is unlikely to be present, and thus, prohibits the automatic braking. Whereas, when "the object position recognition point(s) representing such an object" includes "the present fusion detection point", the apparatus DS determines that the object is likely to be present, and thus, permits the automatic braking. Accordingly, a frequency that the automatic braking is performed for the object which is unlikely to be present is reduced, and the automatic braking can be performed for the object which is likely to be present.

Furthermore, the apparatus DS performs the alert (S440, S415-S420), when the apparatus DS determines, based on the surrounding object information including the object position recognition points, that "the predetermined alert condition different from the automatic braking condition" that is satisfied when the host vehicle has a probability of colliding with the object becomes satisfied (S435: Yes), regardless of whether the detection point representing the position of the object (i.e., the present fusion detection point) that causes the alert condition to become satisfied is obtained at the present time point (namely, regardless of whether at least one of the present camera detection point and the present sonar detection point is present). Therefore, the driver is caused to be able to pay attention to the object that may be present, although neither the present camera detection point nor the present sonar point is obtained.

It should be noted that the present disclosure is not limited to the above embodiment, and may adopt various modifications within the scope of the present disclosure. For example, the apparatus DS can be applied to an autonomous driving vehicle, when the vehicle driving mode is changed from an autonomous driving mode to a mode where the driver drives the vehicle.

The apparatus DS may obtain a point (a detection point) that represents a position of an object around the host vehicle using the cameras 11-14 only (and without using any sonar).

Similarly, the apparatus DS may obtain a point that represents a position of an object around the host vehicle using the sonars only (and without using cameras). Furthermore, disposed positions, object detection areas, and/or the number of "the cameras 11-14, the first to sixth front sonar 21F-26F, and the first to sixth sonar 21R-26R" may be modified.

The automatic braking condition used in S450 may be different from the above-described automatic braking condition. For example, it may be determined that the automatic braking condition becomes satisfied, when the shortest distance among the distances between the body of the host vehicle and each of "the held points and the present detection points" present in the expected travel area is equal to or smaller than a first distance threshold, and the acceleration pedal operation amount AP changes from "0" to a value greater than "0".

Similarly, the alert condition used in S435 may be different from the above-described alert condition. For example, it may be determined that the alert condition becomes satisfied, when the shortest distance among the distances between the body of the host vehicle and each of "the held points and the present detection points" present in the expected travel area is equal to or smaller than a "second distance threshold greater than first distance threshold", and the acceleration pedal operation amount AP changes from "0" to a value greater than "0".

What is claimed is:

1. A vehicle driving support apparatus comprising:

an object detection section configured to repeatedly obtain a detection point representing a position of an object around a host vehicle;

an object recognition section configured to repeatedly update object position recognition points that finally specify said position of said object, based on said detection point obtained by said object detection section at a past time point and said detection point obtained by said object detection section at a present time point;

a vehicle control section configured to perform an automatic braking to avoid a collision between said host vehicle and said object, when determining, based on said object position recognition points, that a predetermined automatic brake braking condition that becomes satisfied when there is a high probability that said host vehicle collides with said object becomes satisfied, wherein, said object recognition section is configured to:

when said host vehicle stops moving, hold said object position recognition points at a time point when said host vehicle stops moving; and when said host vehicle is moving, update said object position recognition points at the present time point, based on said detection point obtained by said object detection section at the present time point and said held object position recognition points, and said vehicle control section is configured not to perform said automatic braking, even when it is determined that said automatic braking condition becomes satisfied if said object detection section cannot obtain, at a present time point, said detection point that is determined to represent a position of an object, which is the same as said object that has caused said automatic braking condition to become satisfied and is specified by said object position recognition points, and wherein said vehicle control section is configured to determine that said automatic braking condition becomes satisfied, when the shortest distance among the distances between a body of said host vehicle and each of said held or updated object position recognition points present in an expected travel area is equal to or smaller than a first distance threshold and an acceleration pedal operation amount changes from 0 to a value greater than 0.

2. The vehicle driving support apparatus according to claim 1, wherein, said vehicle control section is configured to alert a driver of said host vehicle, when determining, based on said held or updated object position recognition points, that a predetermined alert condition that becomes satisfied when said host vehicle has a probability of colliding with said object and that is different from said automatic braking condition becomes satisfied, regardless of whether said object detection section obtains, at the present time point, said detection point that is determined to represent a position of an object, which is the same as said object that causes has caused said alert condition to become satisfied and is specified by said object position recognition points.

3. The vehicle driving support apparatus according to claim 1, wherein, said object detection section is configured to obtain said detection point, based on at least one of sonar information from a sonar that measures a distance between an object present around said host vehicle and said host vehicle using ultrasound and camera information from a camera that obtains image data by taking a picture of a scene around said vehicle; and said vehicle control section is configured to determine that said automatic braking condition becomes satisfied, when a condition that at least one of said held or updated object position recognition points is present in an expected travel area of said host vehicle becomes satisfied.

4. The vehicle driving support apparatus according to claim 2, wherein, said object detection section is configured to obtain said detection point, based on at least one of sonar information from a sonar that measures a distance between an object present around said host vehicle and said host vehicle using ultrasound and camera information from a camera that obtains image data by taking a picture of a scene around said vehicle; and said vehicle control section is configured to determine that said automatic braking condition becomes satisfied, when a condition that at least one of said held or updated object position recognition point points is present in an expected travel area of said host vehicle becomes satisfied.

5. The vehicle driving support apparatus according to claim 1, wherein, said vehicle control section is configured to:

calculate a collision required time (TTC) of each of said held or updated object position recognition points, as obstacle points, present in an expected travel area of said host vehicle, said collision required time (TTC) being calculated by dividing a length of a path along which a body of said host vehicle approaches each of said obstacle points by a speed of each of said obstacle points relative to said host vehicle, select the shortest collision required time (TTCm) from said collision required times; and determine whether or not said predetermined automatic braking condition becomes satisfied by determining whether or not the shortest collision required time (TTCm) is equal to or smaller than an automatic braking threshold (TBth).

* * * * *